No. 726,043. PATENTED APR. 21, 1903.
F. M. FREEBURG.
FIFTH WHEEL.
APPLICATION FILED OCT. 6, 1902.
NO MODEL.
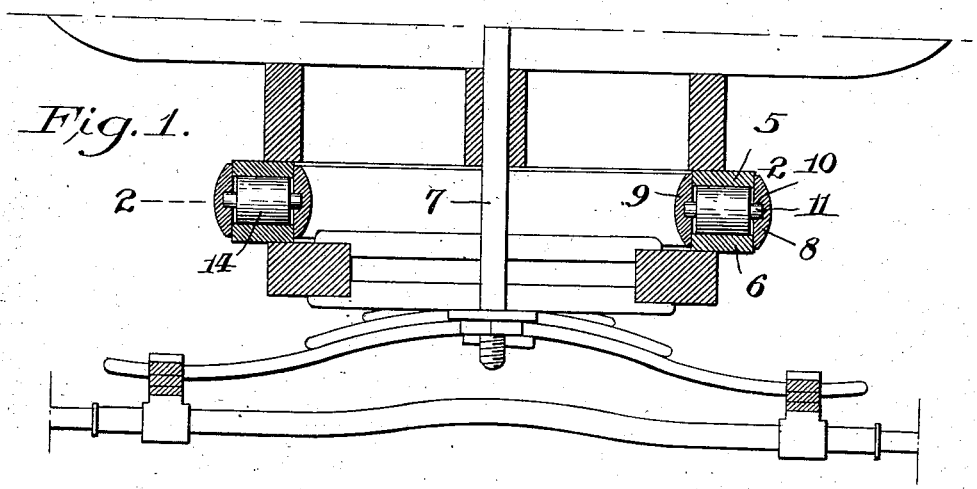
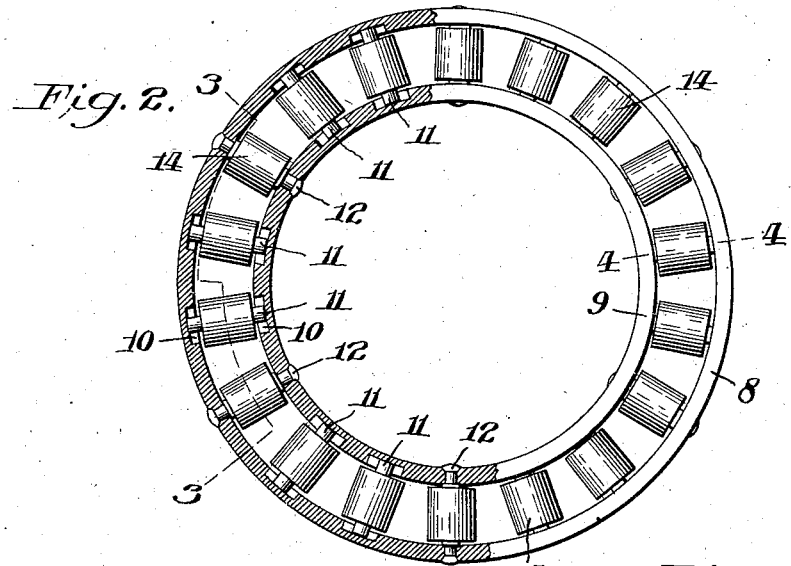
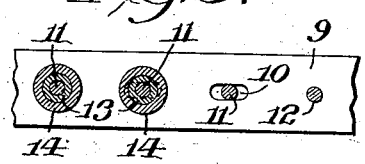
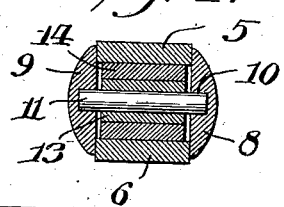
WITNESSES:
R. H. Gamble
R. K. Perkins
INVENTOR
Frank M. Freeburg
BY
A. V. Grout
ATTORNEY.

UNITED STATES PATENT OFFICE.

FRANK M. FREEBURG, OF PHILADELPHIA, PENNSYLVANIA, ASSIGNOR OF ONE-HALF TO RICHARD H. MacCLERNAN, OF PHILADELPHIA, PENNSYLVANIA.

FIFTH-WHEEL.

SPECIFICATION forming part of Letters Patent No. 726,043, dated April 21, 1903.

Application filed October 6, 1902. Serial No. 126,017. (No model.)

*To all whom it may concern:*

Be it known that I, FRANK M. FREEBURG, a citizen of the United States, residing at Philadelphia, in the county of Philadelphia and State of Pennsylvania, have invented certain new and useful Improvements in Fifth-Wheels, of which the following is a specification.

This invention relates to that class of fifth-wheels for vehicles wherein antifriction-rollers are employed to reduce the friction between the coacting parts.

It is the object of the invention to provide a simple, inexpensive, and efficient construction whereby the friction between the coacting parts will be reduced to a greater extent than has been heretofore attained.

With this object in view the invention consists in the novel construction and combinations of parts, which will be hereinafter fully described and claimed.

In the drawings, Figure 1 is a sectional view of a portion of a vehicle equipped with my invention. Fig. 2 is a sectional plan as on the line 2 2 of Fig. 1. Fig. 3 is a sectional detail as on the line 3 3 of Fig. 2. Fig. 4 is a sectional view as on the line 4 4 of Fig. 2 enlarged. Fig. 5 is a perspective view of one of the rollers, its sleeve, and shaft.

5 6 designate the upper and lower circular bearing-plates, which are secured to the body of the vehicle and the axle of the carrying-wheels, respectively, and which are held together by a bolt 7, so as to turn relatively to each other. The mounting and arrangement of these parts are of well-known construction and need no detailed description herein.

8 9 are two concentric rings, which are located one within the other. The inner face of the outer ring 8 and the outer face of the inner ring 9 are each provided with elongated sockets 10, to which are fitted a series of radially-disposed shafts 11, which extend between said rings and which are arranged at intervals, as shown.

The rings 8 9 are securely held together by shafts 12, which are secured at their respective ends to said rings and which are arranged among the shafts 11.

The shafts 11 12 are provided with rotatable sleeves 13, and the latter are provided with rollers 14, which are rotatably mounted thereon, said sleeves and rollers being each independently rotatable about its shaft. These rollers are of substantially the same width as the plates 5 6 and are arranged therebetween, the rollers supporting the body of the vehicle on the upper plate and being supported by the lower plate.

The rings 8 9 extend below the upper surface of the plate 6 and above the lower surface of the plate 5, thereby maintaining the parts in their relative positions and also serving as a guard to prevent the accumulation of dirt about the rollers.

By the above-described construction it will be seen that the majority of the rollers 14 have a slight independent movement toward each other and that said rollers and sleeves 13 are rotatable independently of each other. This construction and arrangement of parts insures a very sensitive and efficient fifth-wheel which is less liable to be affected by the accumulation of dirt, &c., than has been heretofore attained.

I claim—

1. In a fifth-wheel, the combination with the upper and lower bearing-plates, of two concentric rings, means for securing said rings together one within the other, a series of radially-disposed shafts arranged at intervals and extending between the opposing faces of said rings, sleeves rotatably mounted on said shafts, rollers having each an independently-rotatable bearing throughout its length on a sleeve and arranged between said plates, and means for retaining said rollers between said plates.

2. In a fifth-wheel, the combination with the upper and lower bearing-plates, of two concentric rings provided with elongated sockets in their opposing faces, means for securing said rings together one within the other, a series of radially-disposed shafts arranged at intervals and fitted to the elongated sockets in the opposing faces of said rings, rollers rotatably mounted on said shafts and arranged between said plates and means for retaining said rollers between said plates.

3. In a fifth-wheel the combination with the upper and lower bearing-plates of two concentric rings provided with elongated sockets in their opposing faces, means for securing said rings together one within the other, a series of radially-disposed shafts arranged at intervals and fitted to the elongated sockets in the opposing faces of said rings, sleeves rotatably mounted on said shafts, rollers rotatably mounted on said sleeves and arranged between said plates, and means for retaining said rollers between said plates.

In testimony whereof I affix my signature in presence of two witnesses.

FRANK M. FREEBURG.

Witnesses:
ANDREW V. GROUPE,
RALPH H. GAMBLE.